United States Patent [19]

Lang, Jr. et al.

[11] 3,904,614

[45] Sept. 9, 1975

[54] ARYL HETEROCYCLIC TETRAZINES AND METHOD OF PREPARATION THEREOF

[75] Inventors: Stanley Albert Lang, Jr., Pomona; Elliott Cohen, Pearl River, both of N.Y.

[73] Assignee: American Cyanamid Company, Stamford, Conn.

[22] Filed: June 11, 1974

[21] Appl. No.: 478,188

[52] U.S. Cl. ............... 260/241; 424/244; 424/263; 424/275
[51] Int. Cl............................................ C07d 57/08
[58] Field of Search.................................... 260/241

[56] References Cited

UNITED STATES PATENTS 3,166,400   1/1965   Lutz et al............................ 260/241

Primary Examiner—Henry R. Jiles
Assistant Examiner—Robert T. Bond
Attorney, Agent, or Firm—Ernest Y. Miller

[57] ABSTRACT

The preparation of 3-heterocyclic substituted tetrazines or 3-heterocyclic-6-substituted tetrazines is described. These compounds are useful as anti-inflammatory and analgesic agents.

10 Claims, No Drawings

ARYL HETEROCYCLIC TETRAZINES AND METHOD OF PREPARATION THEREOF

PRIOR ART

U.S. Pat. No. 3,166,399 describes a method for controlling undesirable plant growth with 3-phenyl and substituted phenyl tetrazines and corresponding 6-substituted tetrazines. These tetrazines are entirely different from those of the present invention. V. Grakauskas, et al., J.A.C.S. 80, 3155 (1958) describes the chemical preparations of several phenyltetrazines with no utility indicated. O. Meresz, et al. Journal of the Chemical Society Chemical Communications (16) 950 (1972) describe a new chemical synthesis of phenyltetrazines.

DESCRIPTION OF THE INVENTION

This invention is concerned with novel 3-heterocyclic substituted tetrazines or 3-heterocyclic-6-substituted tetrazines, method of use and method of preparation.

The compounds of this invention may be described as s-tetrazines of the formula:

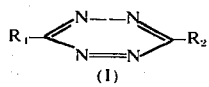

(I)

wherein $R_1$ is selected from the group consisting of 2-furyl, 3-furyl, halo-2-furyl, 2-thienyl, 3-thienyl, loweralkyl-2-thienyl, halo-2-thienyl, 2-pyridyl, 4-pyridyl and 2-benzofuranyl and $R_2$ is hydrogen or lower alkyl. Lower alkyl is defined as those having one to four carbon atoms.

The compounds of this invention may be prepared by one or more of the following methods:

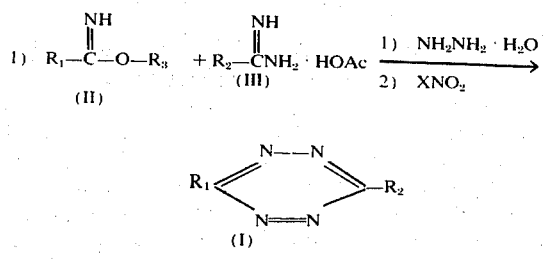

wherein $R_1$ and $R_2$ are as defined above, $R_3$ is alkyl $C_1$–$C_5$ and X is an alkali metal.

The starting iminoheteroate (II), as the free base or its hydrochloride salt, prepared either by Pinner conditions or by sodium borohydride catalyzed addition of alcohol to nitriles, reacts with formamidine (or acetamidine) acetate (or other salts) in the presence of hydrazine hydrate to yield, after oxidation, the desired tetrazines (I). The hydrazine hydrate solution is either removed under reduced pressure or poured into water and the resulting product, collected by filtration or extracted with chloroform, which yielded material after solvent removal. This material is dissolved in acetic acid and treated with sodium nitrite while maintaining the temperature of the solution between 5°–10°C. The solution is diluted with water and if a solid is formed this is collected by filtration. If an oil or suspension is formed the solution is extracted with chloroform. These substituted s-tetrazines can be purified by recrystallization from ethyl acetate or by chromatography on silica gel, eluting with either methylene chloride or a mixture of methylene chloride and methanol.

A further method of preparing the present compounds is as follows:

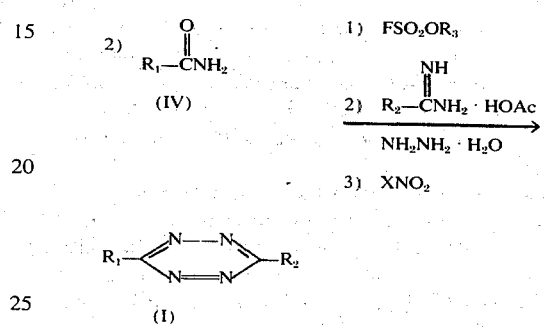

wherein $R_1$, $R_2$, $R_3$ and X are as defined above.

In the above method, it is necessary to "activate" the functionality (amide) by treatment with methyl fluorosulfonate in chloroform. The excess solvent and reagent are removed under reduced pressure and the material is treated as in the first procedure above with caution during the addition of hydrazine hydrate, since the reaction is very exothermic.

A still further method involves the following reaction:

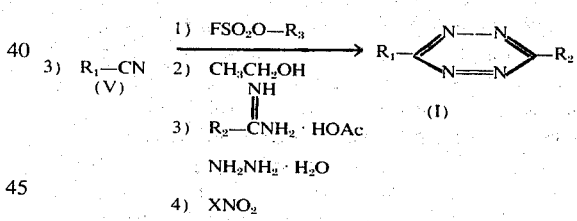

wherein $R_1$, $R_2$, $R_3$ and X are as defined above.

Treatment of arylheterocyclic nitriles (V) with methyl fluorosulfonate, followed by removal of excess reagent, treatment with ethanol followed by formamidine (or acetamidine) acetates and then with hydrazine hydrate and finally oxidation with nitrous acid gives the desired tetrazines (I). This sequence is also extremely exothermic.

The compounds of this invention have been found useful in warm-blooded animals as anti-inflammatory and analgesic agents, in the range of 1 to 250 mg./kg./day in warm-blooded animals. The median or preferred dosage range is between 15–75 mg./kg,/day. The total amount of drug per day per warmblooded animal may vary from 0.02 grams to 10 grams.

The active components of this invention can be used in compositions such as tablets; the principal active ingredient is mixed with conventional tableting ingredients such as corn starch, lactose, sucrose, sorbitol, talc, stearic acid, magnesium stearate, dicalcium phosphate, gums, or similar materials as non-toxic pharmaceutically acceptable diluents or carriers. The tablets or pills of the novel compositions can be laminated or otherwise compounded to provide a dosage form affording the advantage of prolonged or delayed action or predetermined successive active of the enclosed medication. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate and the like. A particularly advantageous enteric coating comprises a styrene maleic acid copolymer together with known materials contributing to the enteric properties of the coating.

The liquid forms in which the novel compositions of the present invention may be incorporated for administration include suitably flavored emulsions with edible oils, such as, cottonseed oil, sesame oil, coconut oil, peanut oil, and the like, as well as elixirs and similar pharmaceutical vehicles. Sterile suspensions or solutions can be prepared for parenteral use. Isotonic preparations containing suitable preservatives are also desirable for injection use.

The term dosage form as described herein refers to physically discrete units suitable as unitary dosage for warm-blooded animal subjects, each unit containing a predetermined quantity of active component calculated to produce the desired therapeutic effect in association with the required pharmaceutical diluent, carrier or vehicle. The specification for the novel dosage forms of this invention are indicated by characteristics of the active component and the particular therapeutic effect to be achieved or the limitations inherent in the art of compounding such an active component for therapeutic use in warm-blooded animals as disclosed in this specification. Examples of suitable oral dosage forms in accord with this invention are tablets, capsules, pills, powder packets, granules, wafers, cachets, teaspoonfuls, dropperfuls, ampules, vials, segregated multiples of any of the foregoing and other forms as herein described.

In determining the acute anti-inflammatory activity of these useful compounds, Royal Hart, Wistar strain rats averaging from 80–90 g. were employed. The rats were fasted overnight prior to dosing and challenge but had free access to water. The drugs, in an aqueous suspension, were administered by gavage in a volume of 1.7 ml./50 g. of rat (this corresponds to a hydration volume used by Winter, et al., Proc. Soc. Exp. Biol. & Med., 111, 544–547, 1962) with a dosage at 250 mg./kg. unless otherwise noted.

The phlogistic challenge used as carrageenin prepared as a sterile 1% suspension in 0.9% sodium chloride for routine testing. An injection of 0.05 ml. (via a 26 gauge needle) was administered into the plantar tissue of the right hind paw. Measurements were recorded 5 hours after drug administration (4 hours after carrageenin challenge) unless otherwise noted.

Volumes of both the normal and carrageenin challenge inflamed feet were measured. The difference between the two measurements was considered to be the increased edema due to the carrageenin injection. Results are expressed as an efficacy ratio of Control (C)/Treated (T). (The ratio of the mean edema volume of either control rats over the mean edema volume of the two treated rats.) If the C/T ratio was equal or greater than 1.41, the test was repeated a second time. If the mean ratio of test 1 and 2 was equal to or greater than 1.43 the compound was accepted as active. The following Table I summarizes the results:

TABLE I

Carrageenin Induced Edema in the Rat

| Compound | Mean Control/ Treated (C/T) |
|---|---|
| 3-(2-Furyl)-s-tetrazine | 2.79* |
| 3-Methyl-(2-thienyl)-s-tetrazine | 3.65 |
| 3-(2-Thienyl)-s-tetrazine | 3.26* |
| 3-(5-Methyl-2-thienyl)-s-tetrazine | 2.73 |
| 3-Ethyl-6-(2-thienyl)-s-tetrazine | 3.21 |
| 3-Methyl-6-(5-methyl-2-thienyl)-s-tetrazine | 3.49 |
| 3-(3-Furyl)-s-tetrazine | 2.23 |
| 3-(3-Thienyl)-s-tetrazine | 4.04 |
| 3-(5-Bromo-2-furyl)-s-tetrazine | 2.96 |
| 3-(5-Bromo-2-furyl)-6-methyl-s-tetrazine | 4.72 |
| 3-(2-Pyridyl)-s-tetrazine | 2.72 |
| 3-(2-Furyl)-6-methyl-s-tetrazine | 2.95 |
| 3-(5-Ethyl-2-thienyl)-s-tetrazine | 2.68 |
| 3-(2-Benzofuranyl)-s-tetrazine | 2.77 |
| 3-(3-Pyridyl)-s-tetrazine | 2.41 |
| 3-Methyl-6-(3-pyridyl)-s-tetrazine | 2.78 |

*Animals were dosed at 125 mg./kg./day. All others 250 mg./kg./day

In order to test erythema in albino guinea pigs (Lederle breeding colony) they were depilitated on their flanks, the evening before testing, with a standard mixture of barium sulfide and gum acacia. On the morning of testing, groups of four guinea pigs were dosed by gavage at the indicated dosage one hour prior to ultraviolet exposure (−1 hour). At O-hour they were restrained in a plastic container which allows exposure of 3 circular spots. They were then exposed to ultraviolet irradiation from a "Hanovia" Kromayer lamp model 10 for 60 seconds. At +1 and +4 hours the degree of erythema for each of the three sites was assessed according to the following scoring system: O-no erythema, 0.5=incomplete circle or faint erythema and 1.0 = complete circle of distinct erythema. Thus, the maximum score for each animal was 3.0. The following Table II summarizes the results using several representative compounds of the present invention.

TABLE II

Ultraviolet Induced Erythema of the Guinea Pig

| Compound | Dose mg./kg | Score 1 Hour | Score 4 Hours | Decision |
|---|---|---|---|---|
| 3-(2-Furyl)-s-tetrazine | 250 | 0.1 | 1.6 | A |
| 3-Methyl-(2-thienyl)-s-tetrazine | 62.5 | 0.2 | 2.3 | A |
| 3-(5-Methyl-2-thienyl)-s-tetrazine | 62.5 | 0.7 | 2.7 | R |
| 3-(3-Thienyl)-s-tetrazine | 62.5 | 0.2 | 1.4 | A |

A = Accept
R = Reject

Tests to show activity against chronic inflammation in adjuvant arthritis were carried out. Groups of three Royal Hart Wistar strain rats, weighing 200 ± 10 g. each were injected intradermally in the right hind paw with Freund's adjuvant (dried human tubercule bacilli in a mineral oil vehicle) at a dose of 2 mg./kg. of body weight. The test compound was administered orally in a 1.5% starch vehicle at the indicated dosage in mg./kg. of body weight once daily on days 0 through 13 post-challenge. Control rats were treated in a similar manner, but given starch vehicle instead of the test compound. On the 14th day post-challenge the diameter of the injected paw (primary lesion) is measured by micrometer caliper. From these measurements of inflammed paws a determination is made of the Relative Surface Area (R.S.A.). This is a ratio expressed as Mean Surface Area of paws of 3 treated rats/Mean Surface Area of paws of 60 control rats. If the Relative Surface Area is equal to or less than 0.76 the compound is tested again. After the second test the Mean Relative Surface Area (R.S.A.) for the rat paws from both tests is calculated and if the Mean R.S.A. is equal to or less than 0.736 the compound is tested a third time and if the Mean R.S.A. of all 3 tests is less than 0.753 the compound is accepted as active. The results with representative compounds of the invention are shown in Table III.

TABLE III

Adjuvant Induced Arthritis in Rats

| Compound | Dosage mg./kg. | Means R.S.A. |
|---|---|---|
| 3-Methyl-(2-thienyl)-s-tetrazine | 25 | 0.685 |
| 3-(2-Thienyl)-s-tetrazine | 25 | 0.542 |
| 3-(5-Methyl-2-thienyl)-s-tetrazine | 50 | 0.612 |
| 3-(5-Bromo-2-furyl)-s-tetrazine | 50 | 0.711 |

The compounds of the present invention are active analgesics when measured by the "writhing syndrome" test for analgesic activity as described by Siegmund, et al., *Proceedings of the Society for Experimental Biology and Medicine*, Vol. 95, p. 729 (1957), with modifications. This method is based upon the reduction of the number of writhes following the intraperitoneal injection of one mg./kg. of body weight of phenyl p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl p-quinone. The test compounds are administered orally at dosage of 200 mg./kg. to groups of two mice each 30 minutes before injection of the phenyl p-quinone. The total number of writhes exhibited by each group of mice is recorded for a 3 minute period commencing 15 minutes after injection of the phenyl p-quinone. A compound is considered active if it reduces the total number of writhes in two test mice from a control value of approximately 30 per pair to a value of 18 or less. The following Table IV summarizes the activity of representative compounds of this invention as active analgesics.

TABLE IV

Mouse Anti-Writhing Test

| Compound | No. of Writhes per 3 Minute Period | |
|---|---|---|
|  | Pair 1 | Pair 2 |
| 3-(2-Furyl)-s-tetrazine | 5 | 13 |
| 3-Methyl-(2-thienyl)-s-tetrazine | 10 | 14 |
| 3-(2-Thienyl)-s-tetrazine | 7 | 11 |
| 3-Methyl-6-(3-pyridyl)-s-tetrazine | 12 | 15 |

SPECIFIC DISCLOSURE

The following examples describe in detail the preparation of representative compounds of this invention.

EXAMPLE 1

Preparation of 3-(2-Furyl)-s-tetrazine

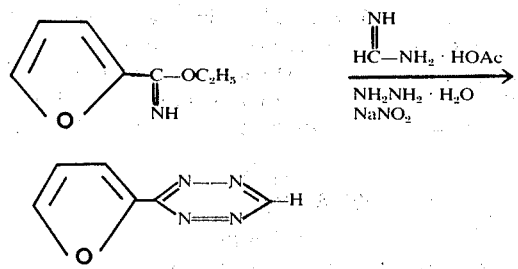

A suspension of 10 g. (0.072 mole) of ethyl 2-iminofuroate and 15 g. (0.144 mole) of formamidine acetate in 35 ml. of hydrazine hydrate is stirred at room temperature for 2–3 hours. The resulting yellow suspension is poured into 250 ml. of water, a solid formed and is collected by filtration and sucked as dry as possible. The damp solid is dissolved in 80 ml. of glacial acetic acid and placed in a cooling bath at 5°–10°C. A 5 g. portion of sodium nitrite is slowly added with vigorous stirring. After addition (10–15 minutes), the dark red solution is poured into 250 ml. of water and the solid is collected and air dried.

The solid is chromatographed on silica gel, eluting the methylene chloride. The initial fraction yields 3,6-bis-2-furyl-s-tetrazine, melting point 199°–201°C., 1.84 g. (12%). The second fraction yields the desired material, 3-(2-furyl)-s-tetrazine, 3.42 g. (32%), melting point 132°–134°C. Anal: Calcd. for $C_6H_4N_4O$ (148.12). C, 48.65; H, 2.72; N, 37.83. Found: C, 48.63; H, 2.86; N, 37.61.

EXAMPLE 2

Preparation of 3-Methyl-2-thienyl-s-tetrazine

Methyl 2-iminothiophenecarboxylate hydrochloride (50 g., 0.28 mole) and acetamidine acetate are treated as described in Example 1 to yield 3-methyl-2-thienyl-s-tetrazine, melting point 132°–135°C., 7.98 g. (16%). Anal. Calcd. for $C_7H_6N_4S$ (178.22). C, 47.17; H, 3.39; N, 31.44; S, 17.99. Found: C, 47.40; H, 3.38; N, 31.79; S, 18.36.

EXAMPLE 3

Preparation of 3-(2-Thienyl)-s-tetrazine

A suspension of methyl 2-iminothiophene carboxylate hydrochloride (50 g., 0.28 mole) and formamidine acetate are treated as in Example 1 yielding 3-(2-thienyl)-s-tetrazine, melting point 103°–105°C., 3.67 g. (8%). Anal. Calcd. for C₆H₄N₄S (164.19). C, 43.89; H, 2.45; N, 34.13; S, 19.53. Found: c, 43.88; H, 2.51; N, 34.35; S, 19.89.

EXAMPLE 4

Preparation of 3-(5-Methyl-2-thienyl)-s-tetrazine

A suspension of methyl 5-methyl-2-iminothiophene carboxylate hydrochloride (50 g., 0.26 mole) and formamidine acetate are treated as in Example 1 to give (5-methyl-2-thienyl)-s-tetrazine, melting point 113°–114°C., 5.1 g. (11%). Anal. Calcd. for C₇H₆N₄S (178.21). C, 47.17; H, 3.38; N, 31.44; S, 18.00. Found: C, 47.03; H, 3.53; N, 30.99; S, 17.93.

EXAMPLE 5

Preparation of 3-Ethyl-6-(2-thienyl)-s-tetrazine

A suspension of methyl 2-iminothiophene carboxylate hydrochloride (50 g., 0.28 mole) and propionamidine acetate is treated as described in Example 1, yielding 3-ethyl-6-(2-thienyl)-s-tetrazine, melting point 69°–71°C., 3.51 g. (6.5%). Anal, Calcd. for C₈H₈N₄S (192.24). C, 49.99; H, 4.19; N, 29.15; S, 16.68. Found: C, 49.89; H, 4.07; N, 29.48; S, 17.13.

EXAMPLE 6

Preparation of 3-Methyl-6-(5-methyl-2-thienyl)-s-tetrazine

A suspension of methyl 5-methyl-2-iminothiophene carboxylate hydrochloride (50 g., 0.26 mole) and acetamidine acetate is treated as in Example 1 to give 4.75 g. (9.5%) 3-methyl-6-(5-methyl-2-thienyl)-s-tetrazine, as a deep red liquid. Anal. Calcd, for C₈H₈N₄S (192.24). C, 49.98; H, 4.19; N, 29.15; S, 16.68. Found: C, 49.82; H, 4.07; N, 29.27; S, 16.77.

EXAMPLE 7

Preparation of 3-Ethyl-6-(5-methyl-2-thienyl)-s-tetrazine

A suspension of methyl 5-methyl-2-iminothiophene carboxylate hydrochloride (50 g., 0.26 mole) and propionamidine acetate are treated as demonstrated in Example 1. Yield 2.49 g. (4.6%) of 3-ethyl-6-(5-methyl-2-thienyl)-s-tetrazine, as a deep red oil. Anal, calcd, for C₉C₁₀N₄S (206.27). C, 52.40; H, 4.87; N, 27.16; S, 15.55. Found: C, 52.78; H, 4.88; N, 27.08; S, 15.81.

EXAMPLE 8

Preparation of 3-(3-Furyl)-s-tetrazine

A suspension of ethyl 3-iminofuroate and formamidine acetate (50 g., 0.25 mole) in hydrazine hydrate are treated as in Example 1 yielding 3-(3-furyl)-s-tetrazine, melting point 112°–114°C., 9.2 g. (22%). Anal. Calcd. for C₆H₄N₄O (148.12). C, 48.65; H, 2.72; N, 37.83. Found: C, 48.31; H, 2.64; N, 37.62.

EXAMPLE 9

Preparation of 3-Methyl-6-(2-pyridyl)-s-tetrazine

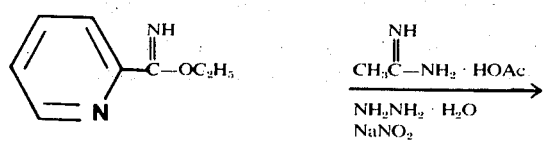

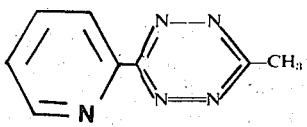

A suspension of ethyl 2-iminopyridine carboxylate and acetamidine acetate are treated as in Example 1 except that the oily residue is extracted with chloroform, to give 3-methyl-6-(2-pyridyl)-s-tetrazine as a purple solid, melting point 61°–64°C., 5.6 g. (13%). Anal. Calcd. for C₈H₇N₅ (173.17). C, 55.48; H, 4.07; N, 40.45. Found: C, 55.32; H, 3.98; N, 40.08.

EXAMPLE 10

Preparation of 3-(3-Thienyl)-s-tetrazine

A suspension of methyl 3-thiophene iminocarboxylate hydrochloride and formamidine acetate are treated as outlined in Example 1 giving 3(3-thienyl)-s-tetrazine, melting point 125°–127°C., 6.9 g. (15%). Anal. Calcd. for C₆H₄N₄S ( 164.19). C, 43.89; H, 2.45; N, 34,13; S, 19.53 . Found: C, 44.04; H, 2.19; N, 33.82; S, 19.58.

EXAMPLE 11

Preparation of 3-(5-Chloro-2-thienyl)-s-tetrazine

A suspension of methyl 5-chloro-2-thiophene iminocarboxylate hydrochloride and formamidine acetate are treated as described in Example 1 to give 3-(5-chloro-2-thienyl)-s-tetrazine as bright red crystals, melting point 124°–126°C., 360 mg. (0.6%). Anal. Calcd. for C₆H₃ClN₄S (198.65). 36.27; H, 1.52; N, 28.20; Cl, 17.85; S, 16.14. Found: C, 36.63; H, 1.61; N, 28.31; Cl, 17.56; S, 16.31.

EXAMPLE 12

Preparation of 3-(5-Bromo-2-furyl)-s-tetrazine

A suspension of 5-bromo-2-furamide (50 g., 0.26 mole) in chloroform is treated with methyl fluorosulfonate and allowed to stir overnight. The solvent and excess reagent are removed under reduced pressure and the resulting solid is mixed well with formamidine acetate, then placed in an ice bath. Hydrazine hydrate is cautiously added. After completion of addition, the ice bath is removed and the remaining sequence of events as outlined in Example 1 is resumed. This yielded 3(5-bromo-2-furyl)-s-tetrazine, melting point 160°–163°C. (dec.), 6.5 g. (11%). Anal. Calcd. for C₆H₃BrN₄O (227.02). C, 31.73; H, 1.33; N, 24.68; Br, 35.20. Found, C, 31.59; H, 1.48; N, 24.64; Br, 35.08.

EXAMPLE 13

Preparation of 3-(5-Bromo-2-furyl)-6-methyl-s-tetrazine

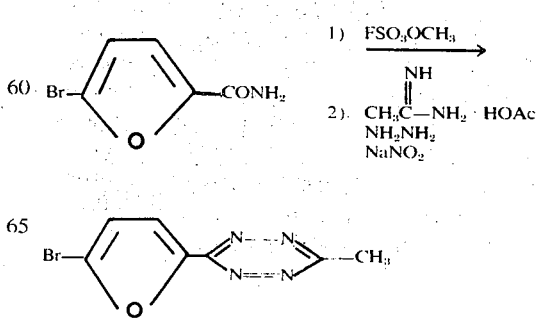

5-Bromo-2-furamide is treated with methyl fluorosulfonate as outlined in Example 12. This product is treated as shown in Example 12 to give 3-(5-bromo-2-furyl)-6-methyl-s-tetrazine, melting point 98°–110°C., 4.82 g. (8%). Anal. Calcd. for $C_7H_5BrN_4O$ (241.05). C, 34.88; H, 2.09; N, 23.24; Br, 33.15. Found: C, 34.46; H, 2.18; N, 23.19; Br, 32.82.

EXAMPLE 14

Preparation of 3-(2-Pyridyl)-s-tetrazine

Ethyl 2-pyridine iminocarboxylate is reacted with formamidine acetate as described in Example 1 with the following exceptions. The excess hydrazine hydrate is removed by filtration of the suspension and the tetrazine has to be extracted with chloroform after dilution of the acetic acid solution with water. The compound 3-(2-pyridyl)-s-tetrazine is obtained, melting point 100°–102°C., 4.6 g. (16%). Anal. Calcd. for $C_7H_5N_5$ (159.14). C, 52.83; H, 3.16; N, 44.01. Found: C, 52.62; H, 3.41; N, 44.27.

EXAMPLE 15

Preparation of 3(2-furyl)-6-methyl-s-tetrazine

A suspension of ethyl 3-iminofuroate and acetamidine acetate are treated as described in Example 1 thereby yielding 3-(2-furyl)-6-methyl-s-tetrazine, melting point 78°–81°C., 810 mg. (2%). Anal. Calcd. for $C_7H_6N_4O$ (162.15). C, 51.85; H, 3.73; N, 34.56. Found: C, 51.46; H, 3.77; N, 34.23.

EXAMPLE 16

Preparation of 3-Methyl-6-(3-thienyl)-s-tetrazine

A suspension of methyl 3-thiophene iminocarboxylate hydrochloride and acetamidine acetate is treated as described in Example 1 to give 3-methyl-6-(3-thienyl)-s-tetrazine, melting point 105°–107°C., 2 g. (4.5%). Anal. Calcd. for $C_7H_6N_4S$ (178.21). C, 47.17; H, 3.39; N, 31.44; S, 18.00. Found: C, 47.26; H, 3.51; N, 31.42; S, 17.96.

EXAMPLE 17

Preparation of 3-(5-Ethyl-2-thienyl)-s-tetrazine

A suspension of methyl 5-ethyl-2-thiophene iminocarboxylate hydrochloride and formamidine acetate are treated as described in Example 1 to give 3-(5-ethyl-2-thienyl)-s-tetrazine, melting point 65°–68°C., 3.2 g. (6%). Anal. Calcd. for $C_8H_8N_4S$ (192.24). C, 49.98; H, 4.19; N, 29.15; S, 16.68. Found: C, 49.98; H, 4.33; N, 29.29; S, 16.72.

EXAMPLE 18

Preparation of 3-(5-Ethyl-2-thienyl)-6-methyl-s-tetrazine

A suspension of methyl 5-ethyl-2-thiophene iminocarboxylate hydrochloride and acetamidine acetate are treated as described in Example 1 to give as a purple oil 3-(5-ethyl-2-thienyl)-6-methyl-s-tetrazine, 2.1 g. (4%). Anal. Calcd. for $C_9H_{10}N_4S$ (206.27). C, 52.40; H, 4.89; N, 27.16; S, 15.55. Found: C, 52.26; H, 5.05; N, 27.51; S, 15.72.

EXAMPLE 19

Preparation of 3-(2-Benzofuranyl)-s-tetrazine

Coumaranamide is treated with methyl fluoro sulfonate as described in Example 12 to give 3-(2-benzofuranyl)-s-tetrazine as an orange solid, melting point 185°–188°C., 4 g. (9%). Anal. Calcd. for $C_{10}H_6N_4O$ (198.17). C, 60.60; H, 3.05; N, 28.27. Found: C, 60.54; H, 2.92; N, 28.03.

EXAMPLE 20

Preparation of 3-(3-Pyridyl)-s-tetrazine

A mixture of n-amyl iminonicatinate and formamidine acetate are treated as described in Example 9, eluting with 2% methanol-methylene chloride, yielding 3-(3-pyridyl)-s-tetrazine, melting point 71°–74°C., 5.4 g. (12%). Anal. Calcd. for $C_7H_5N_5$ (159.13). C, 52.82; H, 3.17; N, 44.01. Found: C, 52.84; H, 3.19; N, 44.09.

EXAMPLE 21

Preparation of 3-Methyl-6-(3pyridyl)-s-tetrazine

A mixture of n-amyl iminonicatinate and acetamidine acetate are treated as described in Example 20 to give 3-methyl-6-(3-pyridyl)-s-tetrazine, melting point 92°–94°C., 6.1 g. (14%). Anal. Calcd. for $C_8H_7N_5$ (173.16). C, 55.48; H, 4.07; N, 40.45. Found: C, 55.13; H, 4.36; N, 40.09.

EXAMPLE 22

Preparation of 3(5-Methyl-2-furyl)-s-tetrazine

A suspension of ethyl 5-methyl-2-iminofuroate (25 g., 0.16 mole) and formamidine acetate (0.32 mole) are treated with hydrazine hydrate as described in Example 1 giving 2.6 g. (10%) of a cherry red solid, melting point 95°–98°C. Anal. Calcd. for $C_7H_6N_4O$ (162.14). C, 51.85; H, 3.73; N, 34.56. Found: C, 51.62; H, 3.86; N, 33.98.

EXAMPLE 23

Preparation of 3-Methyl-6-(5-methyl-2-furyl)-s-tetrazine

A suspension of ethyl 5-methyl-2-iminofuroate (25 g., 0.16 mole) and acetamidine acetate (0.32 mole) are treated with hydrazine hydrate as described in Example 1 giving 1.2 g. (4%), of a red solid, melting point 68°–71°C. Anal. Calcd. for $C_8H_8N_4O$ (176.17). C, 54.54; H, 4.58; n, 31.80. Found: C, 54.53; H, 4.56; N, 31.73.

EXAMPLE 24

Preparation of 3-Methyl-6-(4-pyridyl)-s-tetrazine

A suspension of isopropyl 4-pyridine iminocarboxylate hydrochloride (50 g., 0.25 mole) and acetamidine acetate are treated with hydrazine hydrate as described in Example 1, giving 3.0 g. (7%) of a purple solid, melting point 152°–153°C. Anal. Calcd. for $C_8H_7N_5$ (173.16). C, 55.48; H, 4.07; N, 40.45. Found: C, 55.91; H, 4.07; N, 40.17.

EXAMPLE 25

Preparation of 3-(4-Pyridyl)-s-tetrazine

A suspension of isopropyl 4-pyridine iminocarboxylatehydrochloride (50 g., 0.25 mole) and formamidine acetate are treated with hydrazine hydrate as described in Example 1, giving 1.2 g. (3%) of a purple solid.

We claim:

1. An s-tetrazine of the formula:

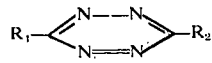

wherein R₁ is selected from the group consisting of 2-furyl, 3-furyl, halo-2-furyl, 2-thienyl, 3-thienyl, loweralkyl-2-thienyl, halo-2-thienyl, 2-pyridyl, 4-pyridyl and 2-benzofuranyl and R₂ is hydrogen or lower alkyl.

2. The s-tetrazine in accordance with claim 1, 3-(5-bromo-2-furyl)-s-tetrazine.

3. The s-tetrazine in accordance with claim 1, 3-methyl-2-thienyl-s-tetrazine.

4. The s-tetrazine in accordance with claim 1, 3-methyl-6-(4-pyridyl)-s-tetrazine.

5. The s-tetrazine in accordance with claim 1, 3-(3-pyridyl)-s-tetrazine.

6. The s-tetrazine in accordance with claim 1, 3-(2-thienyl)-s-tetrazine.

7. The s-tetrazine in accordance with claim 1, 3-(5-methyl-2-thienyl)-s-tetrazine.

8. The s-tetrazine in accordance with claim 1, 3-(3-furyl)-s-tetrazine.

9. A method of preparing a compound of the formula:

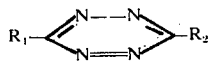

wherein R₁ is selected from the group consisting of 2-furyl, 3-furyl, halo-2-furyl, 2-thienyl, 3-thienyl, loweralkyl-2-thienyl, halo-2thienyl, 2-pyridyl, 4-pyridyl and 2benzofuranyl and R₂ is hydrogen or lower alkyl, which comprises reacting a compound of the formula:

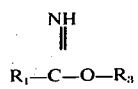

wherein R₁ is as defined above and R₃ is alkyl C₁-C₅ with a formamidine of the formula:

wherein R₂ is as defined above in the presence of hydrazine hydrate, dissolving the reaction product in glacial acetic acid, treating with an alkali metal nitrite and recovering the said compound therefrom.

10. A method of preparing a compound of the formula:

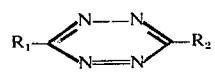

wherein R₁ is selected from the group consisting of 2-furyl, 3-furyl, halo-2-furyl, 2-thienyl, 3-thienyl, loweralkyl-2-thienyl, halo-2-thienyl, 2-pyridyl, 4-pyridyl and 2-benzofuranyl and R₂ is hydrogen or lower alkyl which comprises reacting an amide of the formula:

wherein R₁ is as defined above with an alkyl C₁-C₄ fluorosulfonate in chloroform, followed by the addition of a compound of the formula:

wherein R₂ is as defined above, treating with hydrazine hydrate and subsequently with an alkali metal nitrite in glacial acetic acid and recovering said compound therefrom.

* * * * *

UNITED STATES PATENT OFFICE
CERTIFICATE OF CORRECTION

PATENT NO. : 3,904,614
DATED : September 9, 1975
INVENTOR(S) : Stanley Albert Lang, Jr. and Elliott Cohen It is certified that error appears in the above-identified patent and that said Letters Patent are hereby corrected as shown below:

Column 11, line 38, "halo-2thienyl," should be -- halo-2--thienyl, --; line 39, "2benzofuranyl" should be -- 2-benzofuranyl --.

Column 12, line 1, "$C_1-C_5$" should be -- $C_1-C_5$ --.

Signed and Sealed this thirtieth Day of March 1976

[SEAL]

Attest:

RUTH C. MASON
*Attesting Officer*

C. MARSHALL DANN
*Commissioner of Patents and Trademarks*